US006928414B1

(12) United States Patent
Kim

(10) Patent No.: US 6,928,414 B1
(45) Date of Patent: Aug. 9, 2005

(54) ADVERTISEMENT METHOD USING GAME PROGRAM ON THE INTERNET AND METHOD FOR EXECUTING THE GAME PROGRAM HAVING THE ADVERTISEMENT ACCORDING TO THE ADVERTISEMENT METHOD

(76) Inventor: Jae Heon Kim, 118-803 ByuckSan Apt. Ga-ya-2-Dong, Pusan-Jin-Gu, Pusan (KR)

(*) Notice: Subject to any disclaimer, the term of this patent is extended or adjusted under 35 U.S.C. 154(b) by 1000 days.

(21) Appl. No.: 09/651,862

(22) Filed: Aug. 30, 2000

(30) Foreign Application Priority Data

Apr. 12, 2000 (KR) .................................. 10-2000-19110
Apr. 18, 2000 (KR) .................................. 10-2000-20404

(51) Int. Cl.[7] .................. G06F 17/60; G06F 17/00; A63F 13/00; A63F 9/24
(52) U.S. Cl. .................. 705/14; 463/40; 463/42
(58) Field of Search .................. 705/14; 463/40, 463/42, 30, 31, 32, 41

(56) References Cited

U.S. PATENT DOCUMENTS

| | | | | |
|---|---|---|---|---|
| 5,643,088 A | * | 7/1997 | Vaughn et al. ................. | 463/40 |
| 5,946,646 A | * | 8/1999 | Schena et al. ............... | 702/177 |
| 5,946,664 A | * | 8/1999 | Ebisawa ....................... | 705/14 |
| 5,964,660 A | * | 10/1999 | James et al. ................... | 463/1 |
| 6,036,601 A | * | 3/2000 | Heckel .......................... | 463/42 |
| 6,179,713 B1 | * | 1/2001 | James et al. ................... | 463/42 |
| 6,196,920 B1 | * | 3/2001 | Spaur et al. ................... | 463/42 |
| 6,264,560 B1 | * | 7/2001 | Goldberg et al. ............. | 463/42 |
| 6,267,672 B1 | * | 7/2001 | Vance ........................... | 463/29 |
| 6,267,675 B1 | * | 7/2001 | Lee ............................... | 463/40 |
| 6,324,519 B1 | * | 11/2001 | Eldering ....................... | 705/14 |
| 6,484,148 B1 | * | 11/2002 | Boyd ............................ | 705/14 |
| 6,513,160 B2 | * | 1/2003 | Dureau .......................... | 725/9 |
| 6,616,533 B1 | * | 9/2003 | Rashkovskiy ................ | 463/31 |
| 6,640,335 B2 | * | 10/2003 | Ebisawa ....................... | 717/172 |
| 6,645,068 B1 | * | 11/2003 | Kelly et al. ................... | 463/9 |
| 2001/0032125 A1 | * | 10/2001 | Bhan et al. ................... | 705/14 |
| 2002/0165764 A1 | * | 11/2002 | Wade et al. ................... | 705/14 |
| 2003/0191690 A1 | * | 10/2003 | McIntyre et al. ............. | 705/14 |
| 2004/0143495 A1 | * | 7/2004 | Koenig ......................... | 705/14 |

FOREIGN PATENT DOCUMENTS

WO    WO-9903072 A2 *  1/1999

OTHER PUBLICATIONS

Minson, J., "A Sponsored Sell That Takes the Biscuit" (Abstract only), The Guardian, p. S6, Sep. 1, 1994.*
Rigdon, J.E., "On–Line: Advertisers Give Surfers Games to Play," The Wall Street Journal, p. B1, Oct. 18, 1995.*
Anon., "Falson in New Computer Marketing Venture" (English Abstract only), Dagens Nyheter, Nov. 16, 1995.*

* cited by examiner

Primary Examiner—Nicholas D. Rosen
(74) Attorney, Agent, or Firm—Gardner Carton & Douglas LLP

(57) ABSTRACT

The present invention relates to a method of advertisement by implementing an advertisement as part of a game which brand or product of company is incorporated as one of the game programs so that an item incorporated as the advertisement is found and acknowledged by a gamer and the advertisement becomes as part of the game. According to the present invention, there is provided a method of advertisement by use of a game program implemented on an internet.

6 Claims, 5 Drawing Sheets

| header 4 bites | Mediate variables.......... |

FIG. 4

ADVERTISEMENT METHOD USING GAME PROGRAM ON THE INTERNET AND METHOD FOR EXECUTING THE GAME PROGRAM HAVING THE ADVERTISEMENT ACCORDING TO THE ADVERTISEMENT METHOD

PRIORITY CLAIM

This application claims the benefit of Korean Application No 10- 2000-19110, filed Apr. 12, 2000, and Korean Application No. 10-2000-20204, filed Apr. 18, 2000.

TECHNICAL FIELD The present invention relates to a method of advertisement which is applied to a game on the internet.

BACKGROUND OF THE INVENTION

As the internet is commonly used and has drawn enormous attention from people recently, it is popular as a method of advertisement. As a result, the internet advertisement market is growing rapidly. The reason behind this trend is that it overcomes the limit of existing advertisement and opens new opportunities for advertisement. In other words, internet advertisement not only solves the problem of limited time and space in advertisements of, for example, TV or newspapers, but also allows detailed information about product, usage method, and precautions, etc., to be presented in unlimited fashion.

The most popular method of internet advertisement at present is banner advertisement. The type of advertisement provides small sized advertisement supplied by a relevant site while surfing the internet and accounts for more than 90% of the internet advertisement. However, there are negative views on banner advertisement on the internet in terms of the effect of banner advertisement on each site. That is to say, there is hardly any opportunity for users, who have been exposed to the same banner advertisement more than twice, to click the banner advertisement again. Therefore, banner advertisement is becoming regarded as an obstacle which inconveniences netizens and raises the question of the advertisement effect.

Hence a more proactive way of advertising than the banner method is a prerequisite. New advertisement methods developed with this feature are discussed below.

Replacement methods analyze HTML code of the relevant page accessed by internet and banner advertisement is manifested according to the options set by an internet user. CF advertisement method manifests multi-media for 15 seconds every 30 minutes or one hour. Unconscious web advertisement methods, and advertisement methods by use of cyber money are other examples of known methods.

These advertisement methods, however, can be regarded as simply a transformed type of banner advertisement and the effect of advertisement is dramatically reduced as time goes by.

In conclusion, the main issue of current internet advertisement is not merely describing the strength of products to be advertised, but also supplying diverse services relevant to the product so that the scope of internet and advertisement can be extended.

In order to solve the problem of passive banner advertisements, an advertisement method by use of a game has been recently suggested. One of the instances is the advertisement method of U.S. Pat. No. 5,946,664 to Ebisawa. Ebisawa shows the advertisement during the game though the advertisement exists in the game and processes irrespective of game procedure. Therefore, this method also can be regarded as another transformed type of banner advertisement which manifests advertisement to the user unilaterally.

The other example is advertisement method by use of a slot machine which pays a bonus when three identical advertisement screens are lined up at the same time.

Under the above advertisement methods however, a plurality of clients are not sharing data with one another during the game, but rather on a one for one basis between server and client. Consequently, attention to the game or competition is not high in comparison with a game in which data is shared with other clients at the same time.

The present invention is supplied in order to solve the problem of existing advertisements. Because it allows advertisement inserted in a game program on the internet so that advertisement exists as part of the game and enables a character of the game program or gamer to get a profit. Because the gamer and the character of the game program are allowed to take products advertised more actively in comparison with the conventional banner advertisement, it eventually maximizes the effect of advertisement.

SUMMARY OF THE INVENTION

It is an object of the present invention to provide a method of advertisement by use of a game program implemented on an internet.

It is another object of the present invention to provide a method to implement an internet game program with advertisement made by said method of advertisement.

It is still another object of the present invention to provide a method of advertisement.

According to the present invention, there is provided a method of advertisement by use of a game program implemented on an internet, said method comprising:

(a) deciding type and number of advertisement items and period of advertisement after discussing with an advertiser;

(b) deciding each feature of said advertisement items which is profitable to a character or a gamer or both said character and gamer, and setting number of said advertisement items according to said feature of said advertisement items;

(c) deciding time of said advertisement with said each feature randomly by a generator of time column when total number of said advertisement items and number of said advertisement items to be advertised for a day are decided;

(d) deciding value of co-ordinates, with which said advertisement items are allocated in said game program, according to a generator of co-ordinates column;

(e) examining validity of figure resulting from said generator of co-ordinates column if said figure can be found by said character, and deciding value of co-ordinates of said advertisement items on a map by performing said step (d) again unless said figure is valid;

(f) storing data which are type of said advertisement items, number of said advertisement items to be advertised per day and said time of advertisement resulting from said step (b), (c) and (d); and (g) ordering said data in accordance with said time of advertisement and transferring said data to a client system by time data of a server system. Validity if figure from generator of co-ordinates column is found by the character can be easily checked by use of web information of the game program.

According to the present invention, there is provided a method to implement an internet game program with advertisement, said method comprising:
(a) downloading game program from a server system to a client system;
(b) downloading advertisement data from said server system to said client system; and
(c) implementing said game program in which said advertisement data are incorporated as advertisement items of said game program.

According to the present invention, there is provided a method of advertisement, said method comprising:
(a) storing advertisement data to be advertised;
(b) inputting a character, which exists in a game program and is controlled by a server system, and information relevant to said character;
(c) deciding if a character of a gamer must fight or pass by said character of said server system when said character of server system is found by said gamer during process of said game program;
(d) indicating advertisement items relevant to said character of said server system where said character of said server system collapses when said character of said gamer beats said character of said server system; and
(e) acquiring said advertisement items by said character of said gamer.

Objectives of the present invention mentioned above, other objectives, characteristics and effects etc. can be understood clearly based on reference to the figures and detailed description.

The game system of the present invention is categorized by main game program, server program and client system largely speaking. Specifically, characters such as hero, heroine and extras of the game and objectives (it is called "an item" hereinafter) which changes the direction of the game by placing impact on giving energy to the above character etc. compose the main program. Advertisement can be inserted randomly into the above main program and processes of the game program.

BRIEF DESCRIPTION OF DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 4 shows a structure of packet according to the present invention.

BEST MODE OF CARRYING OUT THE INVENTION

A preferred embodiment of an advertisement method according to the present invention will now be described with reference to the accompanying drawings.

Figure 1:
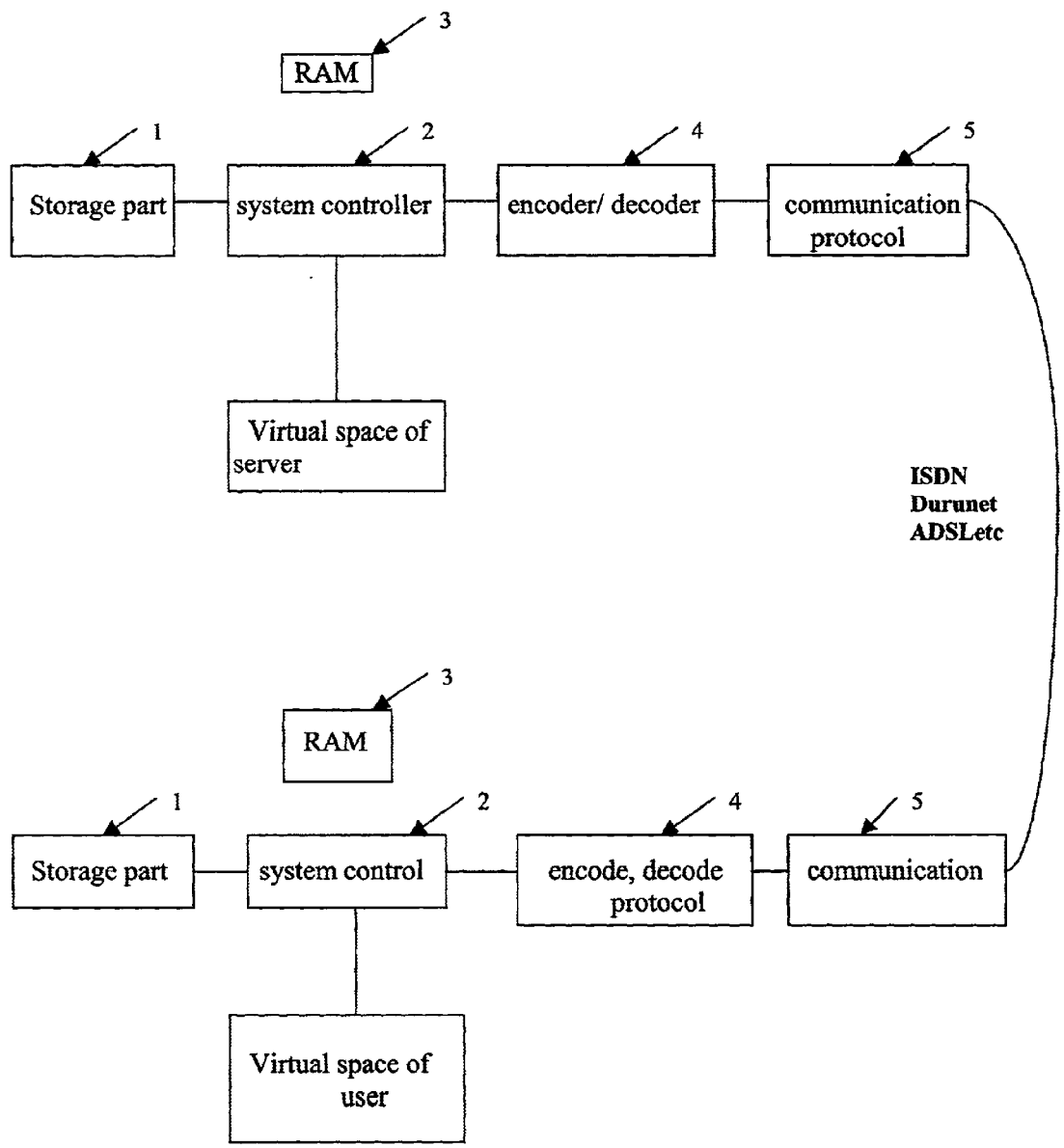
FIG. 1 shows a brief structure of server system and client system according to the present invention.

FIG. 1 shows a brief figure of structure of server system and client system. As shown in FIG. 1, server system and client system of the present invention are composed of following parts. They are storage part (1) in which advertisement data of main game program and commodity are stored, system controller (2) which controls and operates overall game as well as other devices of server as a central processing device, RAM(3), encoder/decoder(4) and communication protocol(5) which operates transfer/receipt of data. A gamer starts a game when a game program and advertisement data are downloaded from the server system and client system. Advertisement data is allocated in the game program based on the temporary location created by generator of column by use of the virtual space of RAM of the server system.

Figure 2:
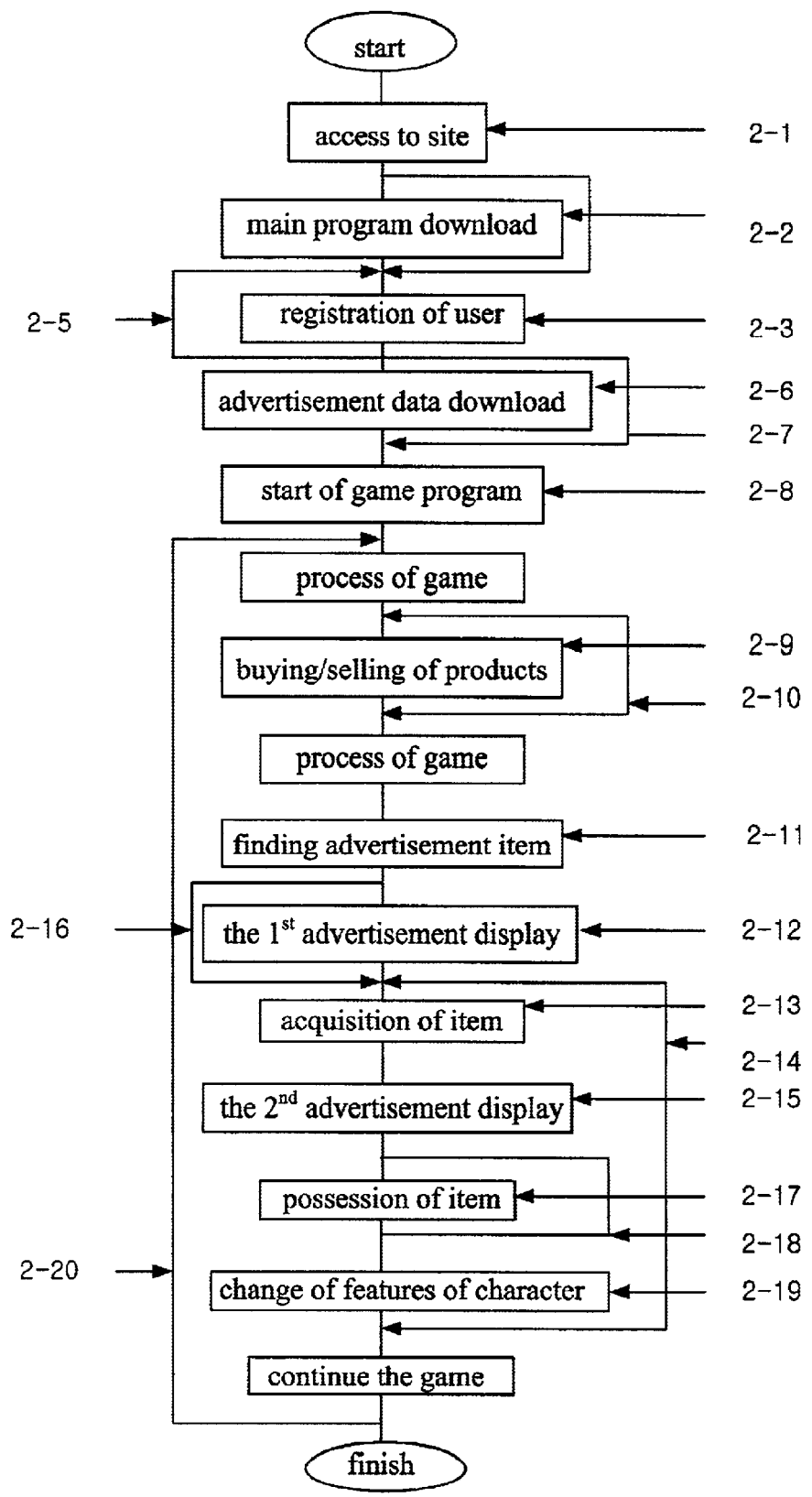
FIG. 2 is a flow chart to implement game of the present invention.

FIG. 2 is a flow chart to implement a game. First of all, a user gains access to the site where a game program of the present invention exists through a communication program (step 2-1). And then, program is downloaded in order to implement the game program (step 2-2). If program downloaded previously exists, the game program can be implemented straight away without download (step 2-3). In order to implement the game program, the user should be registered. If the user has been already registered (2-5), ID and password are to be inputted. A client system with input of ID and password transfers user information to the server system and a server system stores user information which has been transferred from the client system (step 2-6). Necessary data are downloaded based on the outcome from comparison between advertisement data of the client system and that of the server system (step 2-6). If both data are concord, no download is required (step 2-7). Then, the game is finally implemented.

Step 2-8 or step 2-15 manifests the process of a game after start. When the game starts, the total quantity and typ of advertisement are stored at the client system and its contents are shown to the user (or gamer) (step 2-8). Data of this item are continuously updated on a regular basis at the server system. Contents of data downloaded obtain one window on the menu list of the screen so that data of current advertisement item such as total number of advertisement, number of advertisement items which exist currently on the web and efficiency etc. are indicated comprehensively when relevant window is clicked. These marks can be checked at any time during game by clicking the window. A user can purchase and sell required item at a certain spot (item shop) by use of a character of the game program. Items to be sold or purchased can be incorporated as advertisement item. An advertisement item in this case is sold during an advertisement period and is not avilable all the time. Sales volume per day is consistent and selling time is irregular. In terms of time control, regular volume per day is sold randomly with the figure from generator of time column (step 2-9). If user does not find it necessary to buy, he can of course pass by without purchase (step 2-10). An item incorporated into the program is not indicated during the process of program but the advertisement item is manifested on the screen when the character gains access to the scope of the advertisement item (step 2-11). In other words, when a character gains access to the certain scope where item exists, the item is manifested on the screen (finding of item), and a logo of a relevant company of the advertisement item is also shown on the screen at the same time (step 2-12). When the character of the game program acquires this item by the gamer (step 2-13), detailed information of the item i.e., that of products to be advertised is shown on the screen (step 2-15) and simultaneously the client system transfers a code to the server system. When the server system receives the code, the code of the relevant item is deleted and the code change is transferred to each client system so that the server system and client system store number and type of items changed. Advertisement items can be acquired (2-13) only when they are picked up earlier by another character. Even though the character finds advertisement items, it can only see items but not acquire them if another character picks them earlier (2-18).

A gamer proactively approaches an advertisement by selecting items incorporated as a logo of an advertisement item and continues or processes the game in a different way. More effects of advertisement can be achieved in comparison with banner-type advertisement, which shows advertisement passively.

Advertisement offered by an advertiser therefore are categorized into three categories, as below, according to the contents of advertisement. Items used by the game program other than advertisement items of course can be available.

First, it is a method to actualize the profit for both gamer and character as character takes a certain item. For instance, when shoes are advertised, let us assume that shoes exist as item of the game or the role of shoes is to let character run fast. Then, character will run faster if he takes the shoes (2-17) and gamer will be rewarded with relevant bonus accordingly. It not only changes the features of character (2-19) but also offers profit to the gamer at the same time.

Second, though the character takes a certain item, there is no change in terms of character of the game but only provides profit to the gamer. For instance, in the case of a treasure hunting game, it hides treasure and lets people find it. If treasure exists as advertisement product, a gamer who finds the advertisement will be rewarded with the relevant bonus.

Third, the gamer does not get profit but the character does when character takes certain item. For instance, in the order to advertise Honggildong Jeon (Korean old novel) of ABC publication company, the advertisement is acted as an item. If we assume that the role of the item is to make the character disappear, the gamer does not get profit even though character takes new magic by accvepting this advertisement. In other words, only the value of peculiarity is changed. The examples of peculiarity value (feature) of an advertisement item are speed, power, magic power, attack ability, recovery power etc. and these features do not constantly exist but disappear as times go by.

A gamer can, in one embodiment, continue the game at various stages (2-14, 2-20). Because of the fact that products of advertisement, which have been incorporated into the game, are acquired or not place a huge impact on the process of the game, the gamer is expected to take advertisement more actively to obtain profit.

Communication type of data between client system and server system (or packet type) and the method of data communication will be described hereinafter. With regard to type of data exchange between main program of server system and that of client system and the process method, when server system or client system inquire data reciprocally, packet transferred is interpreted and outcome of the command of packet is checked at the database to transmit in a type of packet again.

Figure 4:
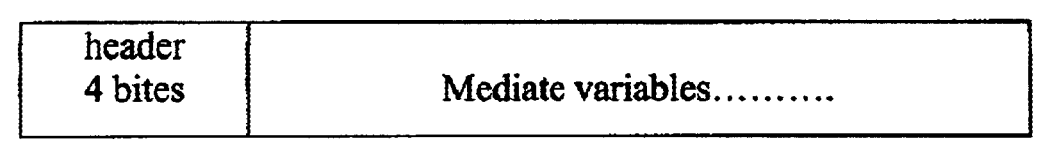

Initial 4 bites of packet always verify the type of the data (FIG. 4). The type which can enter into the header varies by availability or neccessity such as advertisement data, finding of advertisement item and change of number of advertisement items etc. Likewise, type of data transferred is verified by the client system or server system and interpreted accordingly. Communication type of each data is stored at the main program of the server system and client system for the verification.

With regard to the type of data stored at the main program of server system, data at the storage part of server system is stored by following types.

Record 1: data of advertisement company and advertisement item

Name of field: * number of advertisement company, *name of advertisement company, *number of advertisement item, *name of advertisement item, *advertisement title, *size of image (4 bites), *advertisement image 1 (changeable size, within 10k) *size of image (4 bites), *advertisement image 2, *text of advertisement (1024 bites, within 10k) *advertisement logo(40 bites-copy of advertisement)

Record 2: data of advertisement item which is used at present in the advertisement Name of field: * number of advertisement item, *balance volume of advertisement Record 3: data of user who participates in the game Name of field: * number of user, *location of current virtual space,
*Previous co-ordinates—relative co-ordinates in the virtual space (use two dimensional co-ordinates index, x, y)
*Current co-ordinates—relative co-ordinates in the virtual space (use two dimensional co-ordinates index, x, y)

Record 4: data of user members

Name of field: * number of user, * name of user, * address of user, . . .

Record 5: data of pecular figure of user

Name of field: * number of user, * characteristics of user 1, * characteristics of user 2, . . .

Record 6: data of pecular figure of character of user (gamer)

Name of field: * number of user, * number of character, * number of character, . . .

Record 7: data on user who acquires advertisement item

Name of field: * number of user, *number of advertyisement item acquired, *quantity of advertisement item acquired, * availability of transfer etc.

In addition, structure of data stored at the main system of client system is as below.

Record A: it is identical to record 1 mentioned above and advertisement data transferred is stored by file at the server system. When altered data is transmitted from server, change is made immediately.

Record B: it is identical to record 2 and advertisement data transferred is stored by file at the server system. When altered data is transmitted from server system, change of data is made immediately.

Record C: it is identical to record 5 and peculiar figure of C created during game is stored. Though main program of server system stores peculiar figures of all client systems, client system stores only its own peculiar figure at the memory and transfers by use of packet from server system in case of alteration.

Record D: it is identical to record 6 and peculiar figure of own character which is created during game is stored. Though main program of server system stores peculiar figures of all users, client system stores only its own peculiar figure at the memory and transfers by use of packet from server system in case of alteration. Data mentioned above is stored at the memory of server system and client system which is manifested by FIG. 1. Those data are mutually transacted to client system and server system after being transformed to packet type (Refer to FIG. 3). The types of packet are exemplified as below.

Packet A: with the type of data in case of command, it has command header (4 bites of size, data is marked at the header) and mediate variable of command. For instance, header such as addt- advertisement data, fnad-finding advertisement item and mediate variable of command to indicate image or co-ordinates of marking point.

Packet B: with the type of data in case of advertisement data, it interprets data according to header at the server system and client system. Because structure of data is set, data file transferred is interpreted by memory and is stored by category of picture and text at the hard disk. When screen is required, it is displayed by loading at the memory.

Packet C: packet type to transfer co-ordinates

Packet D: it is a structure of data when gamer transfers advertisement item to the client system after finding and acquires it.

Packet E: it is a structure of data when one gamer finds advertisement item and consequently number of advertisement item is altered.

Packet F: it is a structure of data to inform the remaining advertisement item at present.

Packet G: it is a structure of data to inform the number of advertisement item acquired by current user.

Packet H: it is a structure of data to inform the features of character of current user.

Packet I: it is a structure of data to memo or transfer mail among users or between server system and client system. Diverse types of packet are available.

Figure 3:
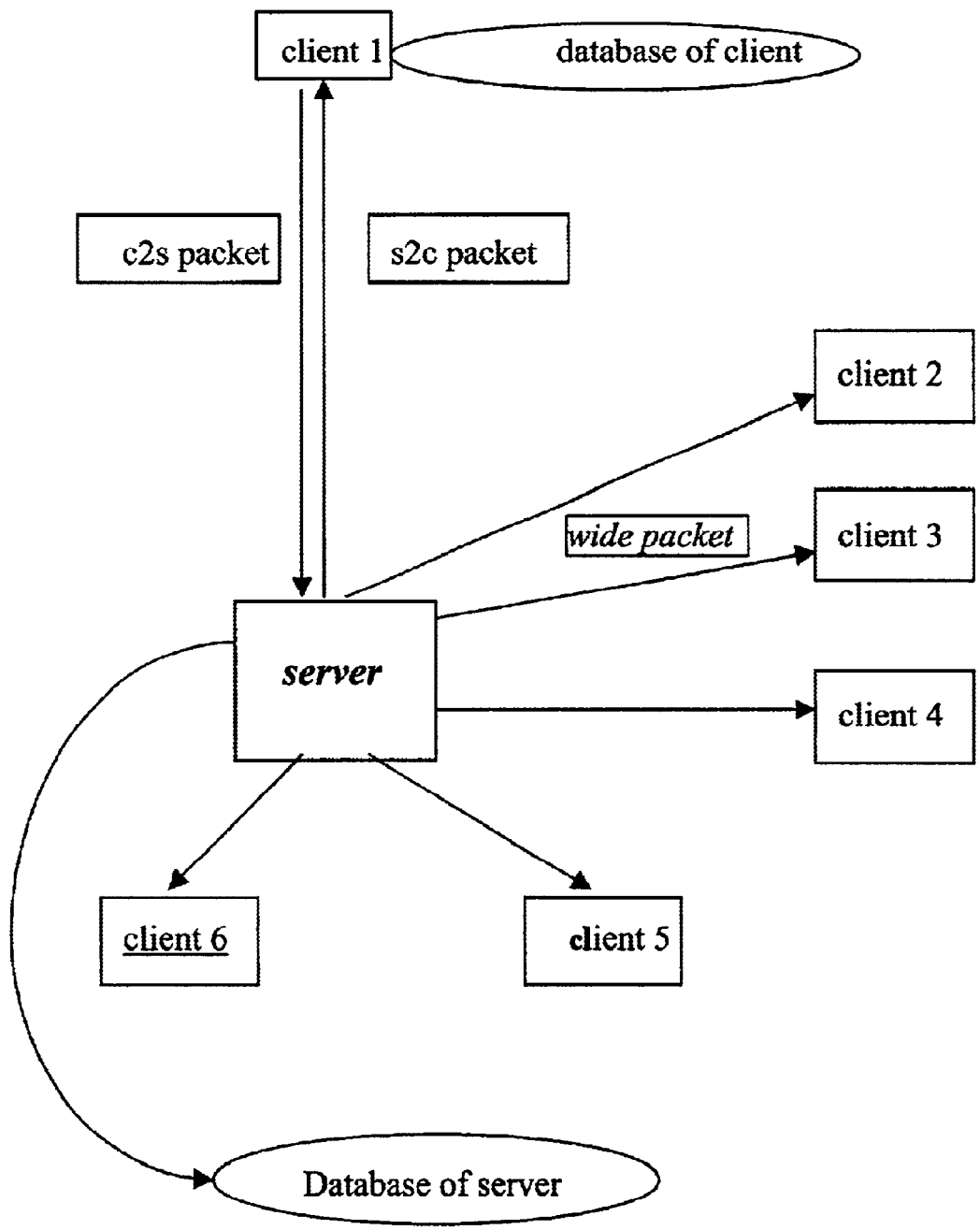
FIG. 3 is a flow chart of data between client system and server system according to the present invention.

According to diverse data structures and packets mentioned above, client system and server system are able to exchange or change data mutually. For instance, it is simply processed to change the number of advertisement item when client system finds advertisement item. As shown in FIG. 3, when a character of gamer finds an advertisement item, the findings are transferred to c2s packet by use of type of packet D. Server system examines header of packet transmitted and renews number of remaining item of record 2 and then transfers data either to s2c packet or to wide packet by use of packet E. Clients which receive packet E examines header of packet and renews record B. This method is applied identically when number of advertisement item and number of item acquired currently during game are informed to client system from server system. In other words, when client system inquires advertisement data altered to server system (packet A), server system, which transmits packet A type, inteprets command and reads at the database of record 1 and transfers data of packet B to s2c packet (FIG. 3). Client system, which has transferred packet B, interprets header and stores at the database of record A type. If content of advertisement must be displayed during game, it is read at the database and displayed at the screen. The method is identical when features of character of client system are transferred to the server system and client system mutually.

A method to incorporate advertisement items in the virtual space of the game program is described hereinafter. Size and layout of server system and client system are basically identical other than the fact that the client system processes overall data of all gamers while client system processes in its own space by own method. It is for minimizing the volume of data to be transmitted by the server system and client system and program facilitated by client system will be set after download from the game server system or distributed by the type of CD. Server system and client system, therefore, do not necessarily transfer all data. It is only required for the client system to transfer its own current co-ordinates to the server system to inform current location and server system needs to transfer co-ordinates to each client system when items to be advertised are manifested at the virtual space of the server system. Because figure to show co-ordinates is extremely small, it can be transmitted to the client system very rapidly. Generator of column with clock of computer is created in the program to incorporate advertisement item.

Server system —it creates x, y co-ordinates by use of generator of column.

It is completed at the memory of server in accordance with above packet C.

Data completed above is transferred to the client.

Client system —when data is transferred, scope of header is interpreted. If scope of header means packet C, it is interpreted according to the principle stored at the main program and then stored at the memory of program. Central processor displays it on the screen. Whenever game program starts, the location of item can be changed and advertisement company or quantity/type of products to be advertised can be varied according to advertisement data of server.

Figure 5:
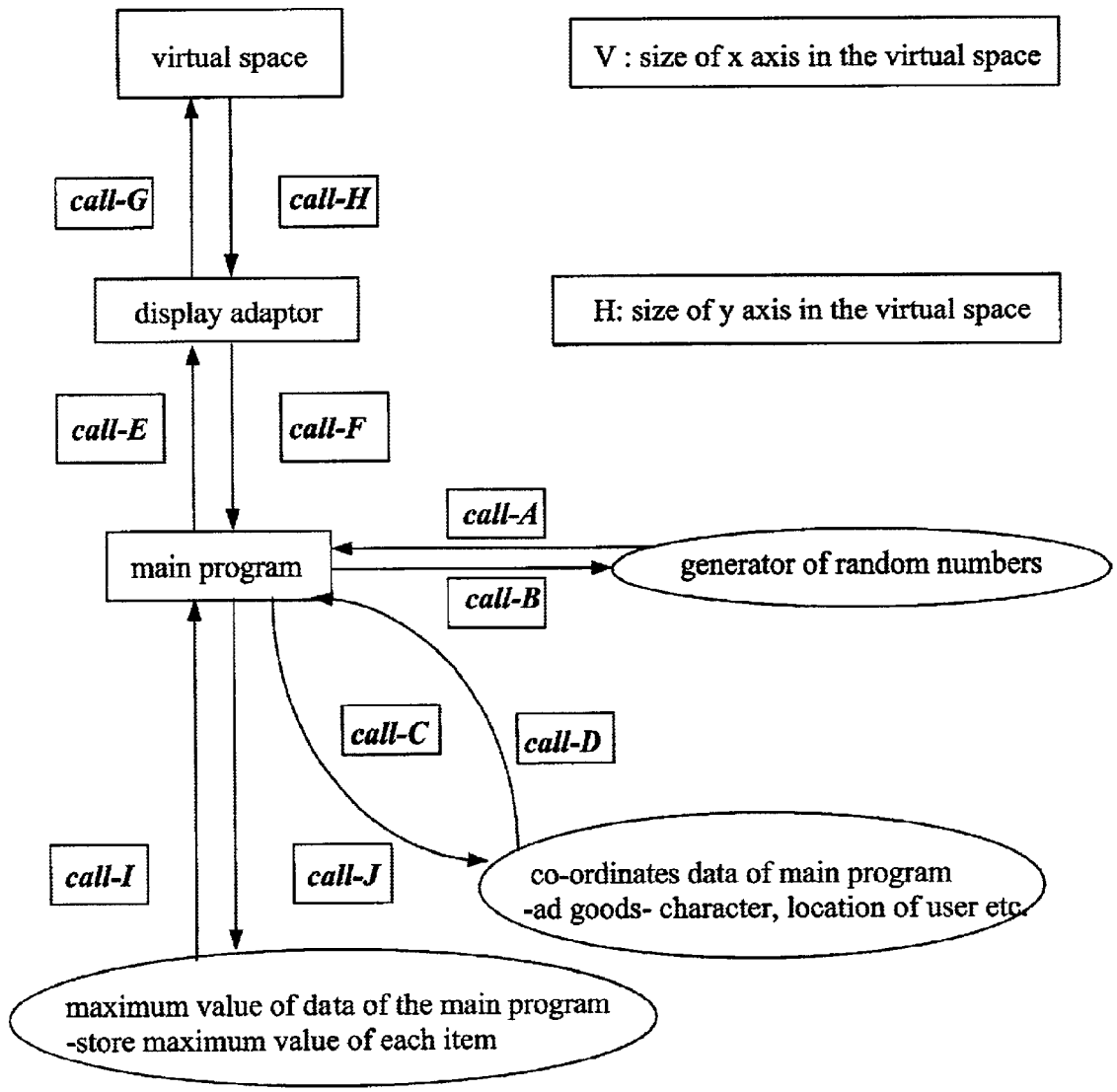
FIG. 5 shows briefly a method to mark advertisement item on the screen according to the present invention.

FIG. 5 describes a process to mark advertisement item in the virtual space.

A) If size of x is H and size of y is V, main program calls generator of column (Call-A of FIG. 5), and receives real number standardized between 0 and 1 (Call-B of FIG. 5).

B) Program of server system calls generator of column twice and finds standard value of x/y axis as well as maximum value of each axis ((Call-I, Call-J). Finally, necessary co-ordinates are obtained by multiplying each value. Maximum data to show maximum value of each item is data on the size of virtual space, storage period of advertisement item, maximum value of features of character and descent rate.

C) When this value is not coincident in comparison with co-ordinates such as structure of virtual space or co-ordinates of advertisement item etc. (Call-C, Call-D), it is displayed on the screen. (Call-E, Call-F). When display on the screen is impossible because of coincidence, process of A) is repeated. Advertisement items are allocated or marked on the screen according to this method.

As another way of outlay of products to be advertised in the game program is to use a character featured at the server. As mentioned previously, an advertisement item is incorporated by game program so that the character of gamer can find or pick it. But, it also can show character of the server in the game program such as a monster. If the character of gamer encounters the monster and wins after confrontation against the monster, the advertisement item relevant to the monster can be shown at the spot where monster the dies.

The character does not necessarily confront against the monster whenever they encounter. They can just pass if the character has no intention to fight. More detailed description on overall activity of the monster is as below.

First, a monster is the character featured from the server for more interesting process of game and contained in the game and exists in both main programs of server and client.

Second, the monster exists at the certain place and certain time by generator of column and appears during game or can consistently appear in a specific area which is required by game.

Third, the gamer can obtain diverse items if he/she beats the monster and appearance or activity of the monster are transmitted to the gamer from the server by type of command packet.

Fourth, even though location of the character of the gamer is controlled by movement of mouse etc., movement of the monster is automatically done according to the main program of server. When it is beaten by gamer, the item is released. Other featurews of the monster are identical to the character of the gamer.

All movement of monsters is controlled by server and the monster appears at a certain time in a certain place by use of generator of column. Server system and user system (gamer system) control the monster by particular data storage. Information of item to be displayed is stored at this particular data storage when the relevant monster dies or a special event occurs. What type of advertisement is linked to the relevant monster can be decided by use of generator of column mentioned above. The appearance of the monster is transferred to the client with the type of command packet. If the co-ordinates of the monster are within the scope of screen of client as main program of client interprets command packet, it is manifested indicated on the screen. If the gamer is beaten as a result of confrontation against monster on the screen, program of gamer transfers the fact of failure to the server so that its own value of features can be modified. In the worst case, the character must be set again. If the gamer wins, the user transfers the fact of win to the server with the type of command packet and data of command packet type is received at the communication unit of server main. Then, a game controller interprets data of command packet type and renews own database by use of unit of database. Server system designates value of peculiarity after game controller beats the monster or products of advertisement in advance (this information is stored at the additional data storage) and transfers to the client system in a type of command packet type by use of a communiction unit. Client system then interprets command packet type which has been transferred and stores its own data storage of monster and renews memory. If advertisement is required to be shown on the screen after renewal of memory, products of advertisement transferred are manifested on the screen.

According to the method of advertisement of the present invention, more effective advertisement can be achieved in comparison with existing banner advertisement because a gamer takes advertisement products which are incorporated in the game program as items actively.

Though the present invention is described based on the reference of embodiments manifested in the figures, they are merely examples. Those who have ordinary skill in the art of the present invention will understand the fact that modifications and substitutions are available. Hence, the genuine scope of the present invention must be decided by the specification of the present invention enclosed.

What is claimed is:

1. A method of advertisement by use of a game program implemented on an internet, said method comprising:

(a) deciding type and number of advertisement items and period of advertisement after discussing with an advertiser;

(b) deciding each feature of said advertisement items which is profitable to a character or a gamer or both said character and gamer, and setting number of said advertisement items according to said feature of said advertisement items;

(c) deciding time of said advertisement with said each feature randomly by a generator of time column when total number of said advertisement items and number of said advertisement items to be advertised for a day are decided;

(d) deciding value of co-ordinates, with which said advertisement items are allocated in said game program, according to a generator of co-ordinates column;

(e) examining validity of figure resulting from said generator of co-ordinates column if said figure can be found by said character, and deciding value of co-ordinates of said advertisement items on a map by performing said step (d) again unless said figure is valid;

(f) storing data which are type of said advertisement items, number of said advertisement items to be advertised per day and said time of advertisement resulting from said step (b), (c) and (d); and (g) ordering said data in accordance with said time of advertisement and transferring said data to a client system by time data of a server system.

2. The method of claim 1, said method further comprising, (h) transferring a contents set at a time when co-ordinates and figure are requested by said client system.

3. A method to implement an internet game program with advertisement made by said method of claim 1 said method further comprising;

(i) downloading game program from a server system to a client system;

(j) downloading advertisement data from said server system to said client system; and (k) implementing said game program in which said advertisement data are incorporated as advertisement items of said game program.

4. The method of claim 3, wherein said advertisement data are automatically downloaded from said server system on a regular time basis for renewal.

5. The method of claim 4, wherein said advertisement data, which has been renewed from said server system, can be checked on a screen.

6. The method of claim 3, wherein said advertisement items are allocated within said game program randomly by a generator of time column and a generator of co-ordinates column.

* * * * *